United States Patent
Spencer

[15] 3,664,428
[45] May 23, 1972

[54] HORSESHOE MANUFACTURE ELECTRICALLY RESISTIVE HORSESHOE AND METHOD OF ATTACHMENT

[72] Inventor: Dudley W. C. Spencer, 619 Shipley Rd., Wilmington, Del. 19809

[22] Filed: Sept. 10, 1970

[21] Appl. No.: 71,121

[52] U.S. Cl. .................................. 168/4, 168/13, 168/17, 168/24
[51] Int. Cl. ............................................................ A01l 5/00
[58] Field of Search ........................... 168/4, 24, 13, DIG. 1

[56] References Cited

UNITED STATES PATENTS

| | | | |
|---|---|---|---|
| 219,944 | 9/1879 | Hoffmann | 168/20 |
| 1,116,326 | 11/1914 | Powlowski et al. | 168/20 |
| 1,761,241 | 6/1930 | Smithson | 168/21 |
| 2,024,265 | 12/1935 | Anderson et al. | 168/4 |
| 3,050,133 | 8/1962 | Ketner et al. | 168/4 |
| 3,200,885 | 8/1965 | Johnson | 168/12 |
| 3,285,346 | 11/1966 | Jenny et al. | 168/4 |
| 3,302,723 | 2/1967 | Renkenberger et al. | 168/4 |
| 3,494,422 | 2/1970 | Clark | 168/4 |
| 3,513,915 | 5/1970 | Sherman | 168/4 |
| 3,524,505 | 8/1970 | Ross | 168/4 |

Primary Examiner—Aldrich F. Medbery
Attorney—Connolly and Hutz

[57] ABSTRACT

A horseshoe includes an electrically resistive stiffening frame which is secured to the hoof by means of thermo accelerated adhesive. The frame is provided with tabs so that electrical power may be applied to the tabs for accelerating the curing of the adhesive.

31 Claims, 23 Drawing Figures

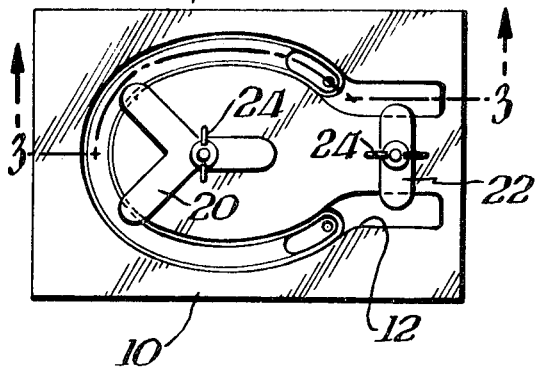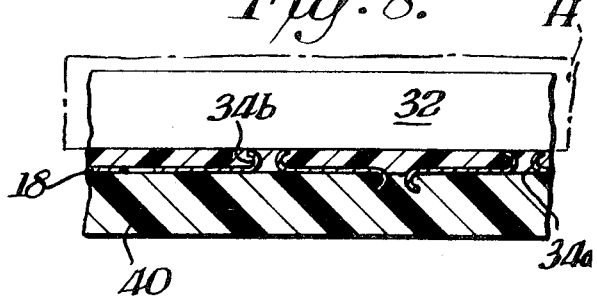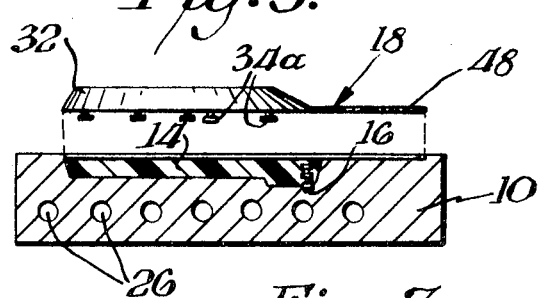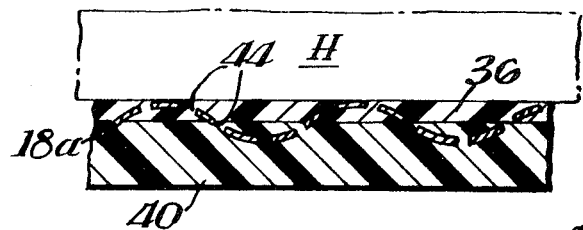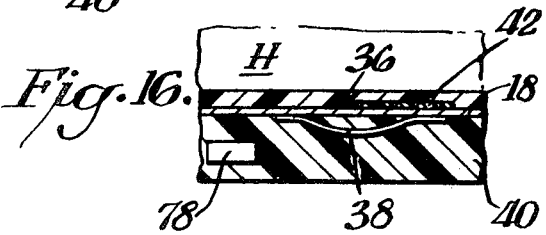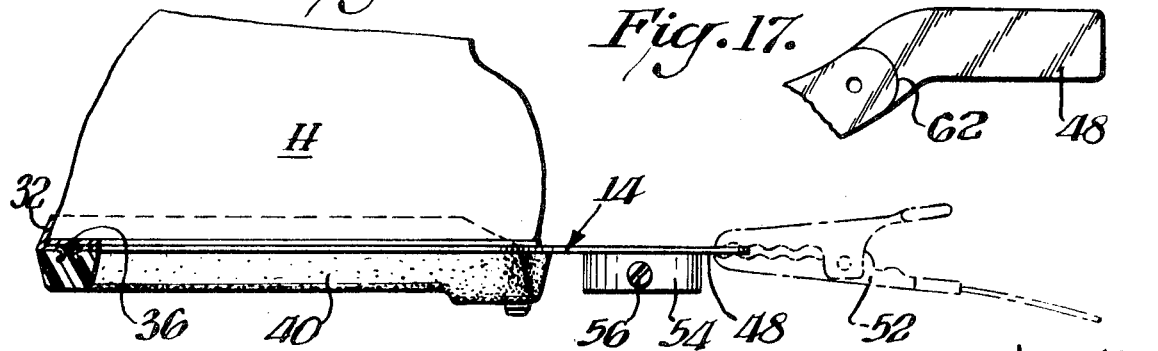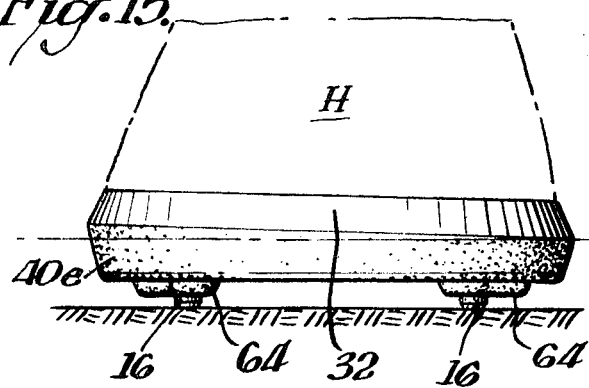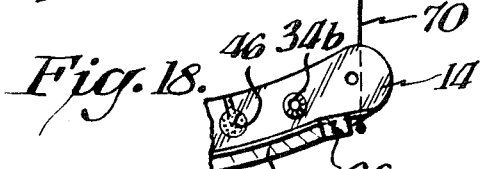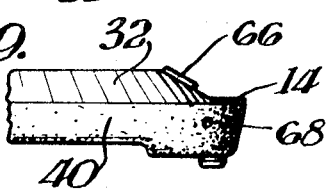

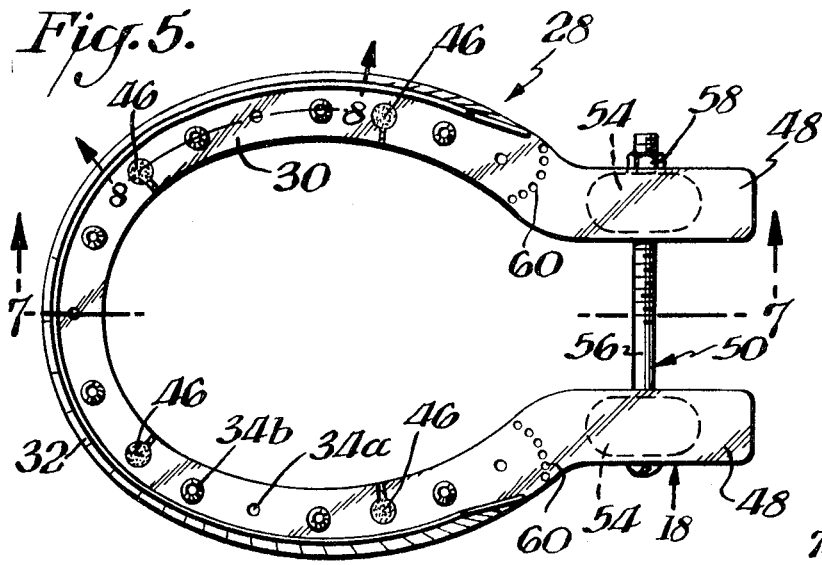
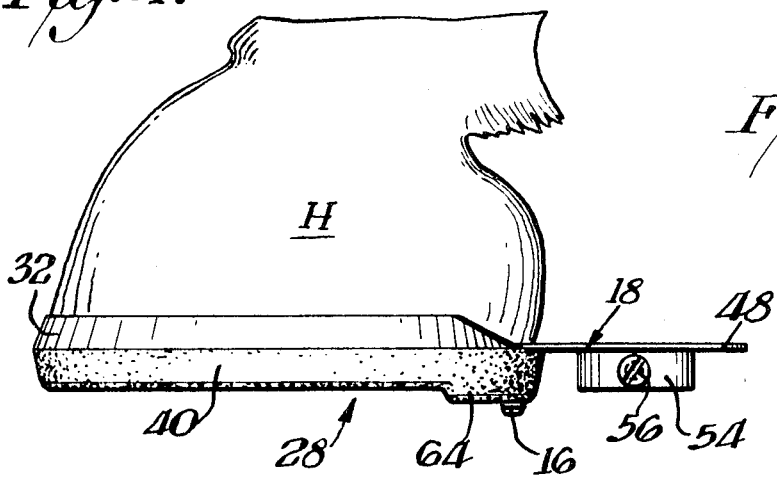
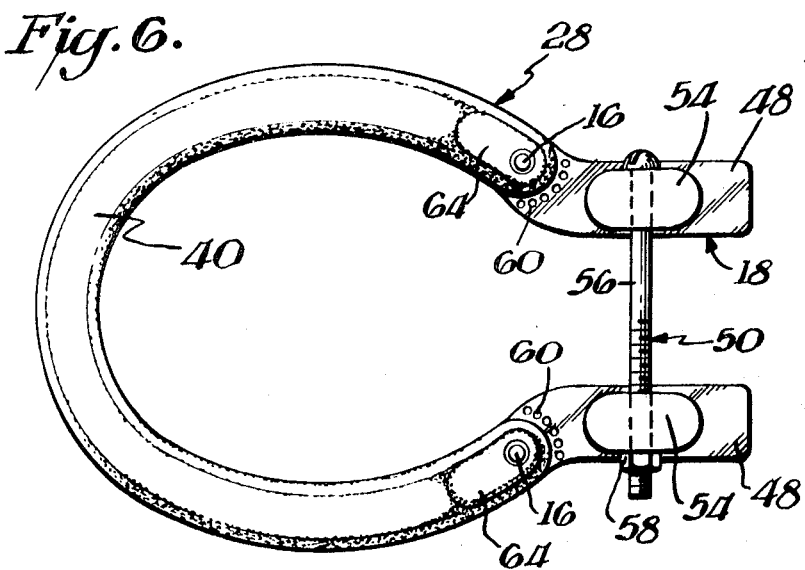
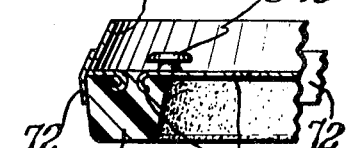
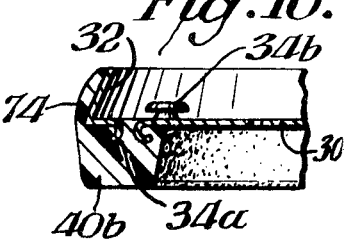
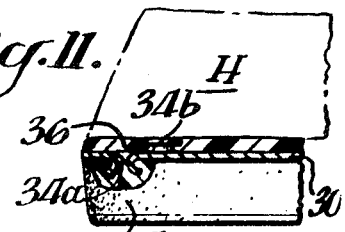
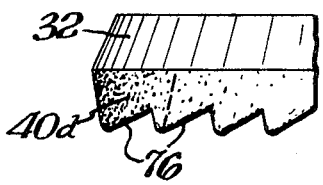
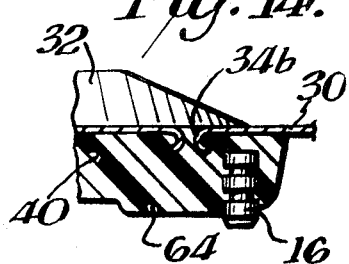

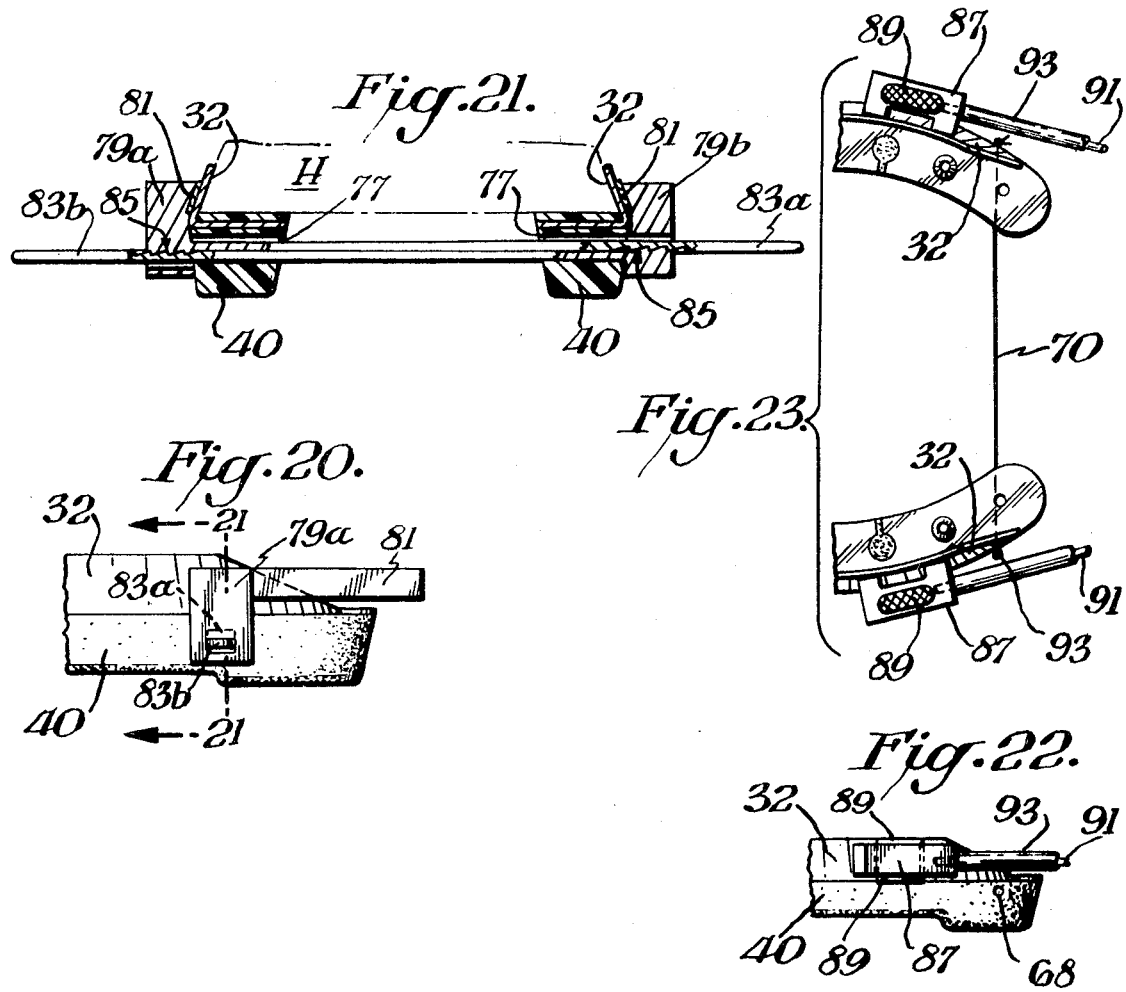

HORSESHOE MANUFACTURE ELECTRICALLY RESISTIVE HORSESHOE AND METHOD OF ATTACHMENT

BACKGROUND OF INVENTION

The horseshoe art is one of the oldest arts known to man. The role of the horse has changed from its early years when the horse was used primarily for work purposes to present times when horses are used for diverse purposes such as racing (including thoroughbred, trotters and pacers), show and pleasure purposes, hunting, polo, riding schools and various work capacities. This change in the role of the horse has maintained a constant search for improved horseshoes and improved means of attachment of shoes to the hoof. Many attempts have been made to provide horseshoes which may be attached without the necessity of nails or other extraneous devices. An ideal solution would be to provide an effective adhesive between the shoe and hoof. While this means of attachment appears desirable it has not proven to be satisfactory primarily because of the long curing period for practical adhesives to set at ambient temperatures. Fast curing adhesives are available, but adhesives suitable for horseshoeing must adhere to hoof material, be non-toxic, adhere to shoe material, and be impervious to urine, water, alcohol, etc. For these reasons practical systems are limited. In this respect the hoof must be elevated with the shoe clamped thereon for such a long period of time as to render this method of attachment impractical. Conversely, if the horse is permitted to keep his hoof on the ground there is a danger that the horse will either kick off or misalign the horseshoe before the adhesive has set. Additionally, where extraneous attaching devices are used and must be left on the hoof for long periods of time, there is a danger that the horse will injure himself by accidental contacts with these clamping devices resulting from kicking or other foot movements.

Various attempts throughout the years at providing improved horseshoes are exemplified by the following U.S. Pat. Nos.: 144,833, 152,975, 206,939, 219,944, 229,103, 359,897, 513,871, 570,493, 592,261, 593,112, 619,361, 671,308, 697,155, 886,957, 1,033,315, 1,039,002, 1,116,326, 1,100,487, 1,212,266, 2,041,538, 3,285,346, 3,302,723, 3,513,915, 3,519,079, British Pat. No. 2122/1868, Swiss Pat. No. 153,341, German Pat. No. 217,283, German Pat. No. 1,191,625.

SUMMARY OF INVENTION

An object of this invention is to provide an improved horseshoe which may be easily attached to the hoof.

A further object of this invention is to provide such a shoe which includes disposable locking means which may be removed after the shoe is securely fastened in place.

A still further object of this invention is to provide a novel and convenient method of attaching the shoe to a hoof.

In accordance with this invention a horseshoe includes a stiffening frame which is secured to the hoof by means of thermo accelerated adhesive. The electrically resistive frame includes tabs so that electrical power may be applied to the tabs to heat the frame and thereby accelerate the curing of the adhesive.

The frame may be a U-shaped metal insert having integral or detachable tabs thereon. Adhesive pockets may be provided in the frame as well as arcuately aligned rows of distorting holes.

A wear plate made of cushioning material may be attached to the frame and may include wear pins spaced from the frame.

The shoe may include a disposable lock which may simply be a pair of holes in the wear plate to permit a tightening member to be inserted through the holes for pressing a peripheral rim on the frame against the hoof. Alternatively, the lock may be in the form of an apertured block mounted on each tab with threaded fastening means spanning the blocks. Each tab may include conventional weakened areas such as perforations or score lines to facilitate the snapping off of the tabs after the adhesive has set.

THE DRAWINGS

FIG. 2 is a plan view of a mold used for securing the wear plate to the frame;

FIG. 3 is a cross-sectional view taken through FIG. 2 along the line 3—3 and additionally showing wear plate and showing the frame about to be placed in the mold;

FIG. 4 is a side elevation view of a horseshoe in accordance with one form of this invention;

FIGS. 5–6 are top and bottom plan views of the horseshoe shown in FIG. 4;

FIG. 7 is a cross-sectional view taken through FIG. 5 along the line 7—7 and showing the application of electrical power thereto;

FIG. 8 is a cross-sectional view in elevation of a portion of the horseshoe shown in FIG. 7;

FIGS. 9–11 are cross-sectional views of portions of alternative forms of horseshoes in accordance with this invention;

FIG. 12 is a side elevation view of a portion of still another form of this invention;

FIG. 13 is a cross-sectional view in elevation of a portion of yet another form of this invention;

FIG. 14 is a cross-sectional view in elevation illustrating the wear pins which may be utilized in this invention;

FIG. 15 is an elevational view of still another form of this invention;

FIG. 16 is a cross-sectional view in elevation of a portion of a further embodiment of this invention;

FIG. 17 is a plan view of a portion of a horseshoe in accordance with another ramification of this invention, FIGS. 18–19 are plan and elevation views, respectively, of still another form of this invention, FIG. 20 is a side elevation view of a portion of still another embodiment of this invention;

FIG. 21 is a cross-sectional view taken through the line 20—20;

FIG. 22 is a side elevation view of a portion of yet another embodiment of this invention; and FIG. 23 is a top plan view of the embodiment shown in FIG. 22.

DETAILED DESCRIPTION

Figure 1:
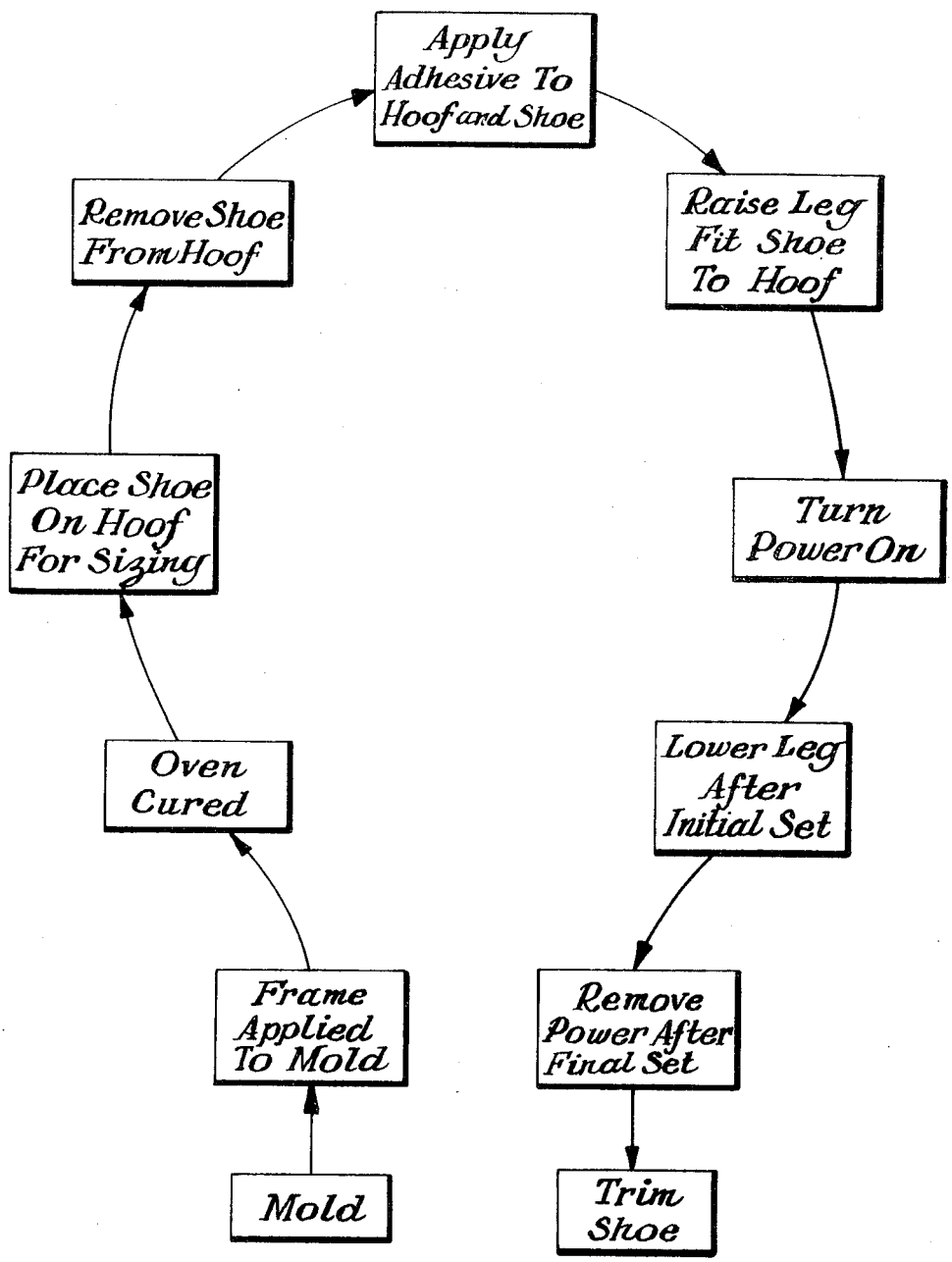
FIG. 1 is a flow diagram schematically indicating the steps used in the method of shoe attachment.

FIG. 1 schematically indicates the steps utilized in the forming and application of the shoe to a hoof. Although the shoe is particularly intended for use with horses it is to be understood that the concepts of this invention may be applied to other applications without departing from the spirit of this invention.

As shown in FIG. 1 the first step in the method is to provide a mold (which is illustrated in greater detail in FIGS. 2–3) for forming an integral horseshoe unit composed of a metal frame and a cushioning wear plate. In this respect the cushioning material is placed in the mold in liquid, powder or other suitable form and the frame applied thereto. The frame and wear plate are made into an integral horseshoe unit by curing the cushioning material in any suitable manner such as oven curing or by the actuating of heating coils or other heating means provided in the mold itself. As later described the shoe frame has multiple functions. One of these functions is to provide sufficient rigidity to act as a stiffener for maintaining the proper shape of the shoe. Although the frame is made rigid, it has a certain degree of flexibility to permit a custom fitting or shaping of the shoe to the hoof.

Referring again to FIG. 1 after the shoe (which consists at this point of the frame and wear plate) is formed, the shoe is placed on the hoof for proper sizing. In this respect the flexible nature of the frame is utilized to permit the necessary distortions thereof for accurately shaping the shoe while the rigid nature of the frame assures maintaining this shape. The shoe is then removed from the hoof and a thermo accelerated adhesive is applied to both the hoof and the upper surface of the shoe. The horse's leg is then raised and the shoe is placed on the hoof. At this point the temporary lock is engaged. Electrical wiring is clipped to the shoe frame to permit the application of electrical power thereto so that while the horse's leg is raised the power can be turned on. The frame which is electrically resistive acts as a heater to accelerate the curing action of the adhesive. After a short time an initial set or curing of the adhesive takes place and the horse's leg may be lowered. Because of the initial set there is no danger of the shoe falling off. The electrical power, however, remains on until the final set occurs at which time the power is disconnected from the shoe and any necessary trimming steps may take place. Accordingly, where detachable mechanical locks are used for a temporary attachment of the shoe to the hoof these locks may be removed. Additionally, where tabs are provided on the metal frame for attachment of the electrical power the tabs may be removed or bent to conform to the general shape of the shoe.

In an alternative method pressure "follow-up" adhesives, such as the Hycar-Phenolics, are used. Unlike FIG. 1 the heating cycle can be done entirely while the horse's foot is on the ground. This permits a curing cycle up to several hours if necessary. Additionally, shoes can be simultaneously applied to all four feet.

FIGS. 2-3 illustrate a suitable mold 10 usable with this invention. As indicated therein mold 10 includes a cavity 12 for any suitable cushioning material such as thermo plastic or elastomeric substance 14 which will later form the wear plate. Before substance 14 is introduced to the mold wear pins 16 are inserted in the appropriate portions of the cavity. Metal frame 18 is then placed in the cavity in contact with the substance 14. Frame 18 is locked in place by any suitable fastening means such as clamp plates 20, 22 adjustably held in place by threaded fasteners 24. As is apparent plates 20 and 22 may be pivoted or even removed to facilitate the application of frame 18 to mold 10. FIG. 3 illustrates the inclusion of heating coils 26 for the curing of substance 14. As shown in FIG. 1, however, the curing may take place in an oven or in any other suitable manner.

FIGS. 4-7 illustrate one embodiment of a horseshoe 28 formed in accordance with this invention. As indicated therein U-shaped metal frame 18 includes a flat plate 30 and an upstanding inwardly inclined peripheral rim 32 which generally conforms to the shape of the hoof H. U-shaped plate 30 is made of any suitable electrically resistive material such as being made of a resistive metal or of any material having electrically resistive paths thereon to permit the completion of an electrical circuit for accelerating the curing of the adhesive which is applied thereto.

A plurality of adhesive pockets are formed in plate 18. For example, as shown in FIG. 9-10, these pockets may be formed by punching holes 34 into plate or frame 18 with the punching alternating in direction so that the punched material or pockets are formed on both sides of the plate 30. Thus the downwardly extending pockets 34a receive the liquid or powder substance 14 when the frame is inserted in mold 10 to assure a firm anchoring of the wear plate to the frame when the substance 14 is later cured. Similarly, upwardly projecting pockets 34b receive adhesive substance 36 (FIG. 11) which is later applied to the hoof H and plate 30.

Although punched holes 34 provide a convenient effective means of forming adhesive pockets, other types of pockets or anchoring means may be used. FIG. 16, for example, illustrates the provision of loops 38 on the lower surface of frame 18 for anchoring the wear plate 40 to the frame. Additionally, FIG. 16 illustrates the inclusion of screen segments or other mesh material 42 spot welded to the upper surface of frame 18 for receiving adhesive 36 which is applied thereto.

FIG. 13 illustrates still another alternative means of assuring a firm anchoring of the wear plate 40 and adhesive layer 36 to the frame. As indicated therein frame 18a is not planar but rather is corrugated or undulated and includes a plurality of spaced perforations 44 to permit the uncured material to freely flow therethrough and remain therein upon subsequent curing.

As shown in FIG. 5 shape distorting holes 46 extend from an edge of plate 30 to permit a certain degree of flexibility to the plate. Thus while frame 18 is made of a material which is generally rigid and, therefore, acts as a suitable stiffener, the inclusion of holes 46 permits the shape of frame 18 to be distorted for custom sizing or fitting of the frame on the hoof. Advantageously holes 46 are arcuately shaped rather than slit shaped for better stress distribution.

The ends of insert or plate 30 include integral extensions or tabs 48 upon which are mounted disposable locking device 50. Additionally, tabs 48, as most clearly shown in FIG. 7, provide a convenient and readily accessible means of attachment of electrical power clips or connectors 52 to the metal frame so that the frame forms a part of a circuit to accelerate the curing of adhesive 36.

In the embodiment shown in FIGS. 4-7 locking device 50 comprises a block 54 attached on each tab 48. Blocks 54 may be permanently secured to the tabs. If desired, however, the blocks may be screwed or otherwise temporarily fastened to the tabs for reuse on other shoes. Blocks 54 have smooth apertures through which any suitable fastener such as bolt 56 may be inserted and locked thereon by nut 58. In use the locking device 50 would maintain the frame including its rim 32 in contact with the hoof to assure attachment of the shoe to the hoof until the adhesive 36 has cured. Once a curing has been effectuated lock 50 and tabs 48 may be removed since these elements are no longer needed on the finished shoe. For this purpose weakened areas may be provided at the juncture of tabs 48 and plate 30. FIGS. 5-6, for example, illustrate these weakened areas to be arcuately arranged perforations 60. FIG. 17 shows an alternative arrangement wherein a weakened area is formed by score line 62. If desired, rather than providing actual weakened areas on the frame 18 indicia may be marked thereon and the tabs removed by any suitable cutting instrument. Similarly, the padded areas 64 which are illustrated in FIGS. 4 and 7 may itself comprise the indicia since the frame 18 is intended to terminate flush with the vertical extension of pads 64 in the finished form of the shoe.

FIGS. 18-19 show a particularly effective form of this invention wherein the tabs provided for electrical connection are flanges 66 integral with the rim 32 of the frame. The disposable locking device in this embodiment is conveniently simply a pair of holes 68 through which are inserted any suitable tightening member 70 such as a wire, a polymer locking device such as made for electric cable bundles, or sturdy cord.

FIG. 19 shows still another alternative disposable locking device which would be particularly adapted for use with an arrangement which includes tabs 66. As illustrated therein the locking device is simply a conventional removable band 72 of the type customarily used for pipe fittings with the band having its own locking device.

With the embodiment shown in FIGS. 18-19 after the adhesive has permanently set and the electrical attachment removed from tabs 66, tabs 66 may be cut off by any suitable cutting instrument or by a weakened connection to the rim or may simply be distorted or pushed upward to conform to the general shape of rim 32. The embodiment of FIGS. 18-19 has an advantage over that shown in FIGS. 4-7 in that the temporary locking device and the tabs are of minimal size which minimizes the likelihood for a horse to injure himself as might otherwise occur by the inclusion of the enlarged tabs and locking members shown in FIGS. 4-7. In conjunction with this it is also within the concept of this invention to completely omit tabs 66 and utilize the rim 32 itself as the tabs for the application of electrical power.

FIGS. 20-21 shows still another form of detachable tab and locking means. As indicated therein slots 77 are formed in wear plate 40. In this embodiment the tabs are in the form of blocks 79 made of any suitable material such as light weight aluminum and having resistive extensions 81 secured thereto so that the electrical power may be attached to extensions 81. Alternatively, the block itself may be made of a resistive material to avoid the need for extensions 81. In the form of the invention shown in FIGS. 20-21 an elongated band 83a is made integral with block 79a and an elongated band 83a is made integral with block 79b. Bands 83a and 83b have mating ratchet teeth 85 to permit the bands to be pulled in one direction only thus causing the blocks 79a and 79b to move toward each other but to prevent movement in the opposite direction. In this manner the blocks may lock the shoe on the hoof. Other ramifications of this embodiment are also possible. For example the bands may be made of other materials such as nylon and made separate from the blocks and the blocks may include one way ratchet teeth.

In operation bands 83a and 83b are inserted through slots 77 and the blocks 79a and 79b are pulled toward each other to effectuate the locking action. Electrical power is then applied to extensions 81 and the curing takes place in the manner previously set forth. When the curing is completed bands 83a and 83b are cut with any suitable instrument to permit removal of blocks 79a and 79b.

FIGS. 22-23 show a particularly noteworthy form of this invention wherein the tabs are in the form of magnets 87 which are shown as being U-shaped with knurled finger gripping surfaces 89. Electrical cables 91 are attached to magnets 87 in any suitable manner with a protective insulating jacket 93 being provided on the cables. The shoe itself may be locked on the hoof in any suitable manner such as through the use of tightening member 70 through apertures 68 as shown for example in FIGS. 18-19. When it is desired to begin the curing action, electrical power may be easily applied to the metal frame 32 by simply placing the magnets 87 against the frame. Operating parameters are chosen in conjunction with the specific materials to maintain the temperature below the Curie point of the magnets.

Wear plate 40 may take various forms. For example, as shown in FIG. 9 the wear plate 40a terminates at the lower surface of insert 30. FIG. 10, however, shows an embodiment wherein a rim 74 is formed on the wear plate 40b juxtaposed rim 32. FIG. 11 shows still another embodiment wherein neither the insert 30 nor the wear plate 40c has a rim. In the rimless embodiment of FIG. 11 the frame may be pre-formed without a rim or the rim may have a weakened connection to the remainder of the plate and later snapped off.

FIG. 12 shows still another ramification of this invention wherein the wear surface of wear plate 40d has ripples or undulations 76 to act as anti-skid means.

FIG. 14 shows another advantageous feature of this invention wherein wear pins 16 are provided in the form of metal studs and project slightly from pads 64 of wear plate 40. As further shown in FIG. 14 the studs are spaced from insert or plate 30 so that there is cushioning material between these metal parts to prevent the studs from contacting the insert.

As previously noted studs or wear pins 16 may be formed in the molding operation by being properly placed in mold 10 of FIG. 3. During this molding operating lead weights, for example, may also be inserted in the mold cavity to be embedded in the substance 14 and thus to be embedded in the resultant wear plate 40. FIG. 16 illustrates one of these weights 78. The inclusion of such weights is desirable for correctional purposes for correcting the gait or movement of the horse. Additionally substance 14 could also have metal particles or sharp sand incorporated in the mix to aid in providing a non-slip surface. Similarly, as shown in FIG. 15 the wear plate 40e may be made of non-uniform thickness at any desired angle for corrective purposes.

Various materials may be used for the parts of this invention. The plastic wear plate 40 may, for example, be made of the same material as adhesive 36. Such materials include suitable epoxies, polyurethanes, hycar-phenolics, acrylics, solvent activated materials, hot melts, thermo plastics, thermo-setting substances and rubber-like compounds. A particularly advantageous material is adiprene with a moca curing agent.

Advantageously, the adhesive is made of a two component mixture with the polymer being packaged separate from the curing agent. In this manner the adhesive can be formulated for long pot life to give ample time for placing and working with the adhesives. When rapid curing is desired the temperature can be raised, adjusted or cycled in such a way as to be ideal for the polymer adhesive to get maximum results.

In its application it has been found that the electrical requirements are about one volt at 50 amps whereby a frame which is designed for the correct resistivity will act as a heater to cure the adhesive. In general the electrical requirements are 0.01 to 10 volts and 10 to 300 amps. It is only necessary to hold the hoof elevated for only about 2 minutes whereupon a sufficient initial setting of the adhesive occurs. After lowering the hoof the power can remain on for as long as necessary so that the adhesive is completely cured or set. The curing time would vary with the particular adhesive. For example where a horse is allergic to epoxies a nitrile based rubber or acrylics would be used with a different curing time.

In addition to the use of wear plate 46 for corrective measures in the horse's gait, variations may be made to the frame or insert itself for particular purposes. In this respect during actual use, when the horse's hoof contacts the ground there is a tendency for the shoe to spread. Recognizing this tendency, the spreading action can be either facilitated or minimized in accordance with the thickness of the insert or frame. Thus when the frame is made thicker it offers greater resistance to spreading and conversely when it is made thinner it enhances the spreading action. Accordingly, where the shoe is intended to be used on, for example, a trotter, the flat surface 30 of the frame is made about one-eighth inch thick to minimize spreading. Where the shoe is to be used on, for exampler a jumper, insert 30 is made about 0.02 inches thick to facilitate spreading for increased frog action of the hoof with the ground.

The shoe of this invention represents a marked improvement over prior shoes. In this respect the cushioning wear plate acts as a shock absorber for the hoof. Moreover, the shoe restores the natural foot flexing action in contrast to the vice-like grip of conventional steel shoes and nails. Additionally, there is reduced hoof damage by eliminating the need to attach the shoes by nailing. Further the shoe permits repair to normal hoof damage which might occur from cuts and abrasions. In general the shoe promotes healthier feet by allowing normal hoof growth and prevents decaying between the hoof and shoe.

What is claimed is:

1. A device for covering the wear surface of a foot of an animal comprising a stiffening horse shoe frame having an upper surface and a lower surface, a wear plate secured to said lower surface of said frame, a thermo accelerated adhesive for said upper surface, a pair of electrically resistive tabs on said frame, and said frame comprising electrically resistive means between said tabs for accelerating the curing of said adhesive when electrical power is applied to said tabs.

2. A device as set forth in claim 1 including removable locking means for holding the device on a foot during the curing of said adhesive.

3. A device as set forth in claim 2 wherein said frame is a U-shaped metal insert, said tabs being extensions of said insert, anchoring pockets being in said insert, and shape distorting holes extending from an edge of said insert.

4. A device as set forth in claim 3 wherein said wear plate is made of cushioning material, and said insert including removal means for facilitating the removal of said tabs from said insert.

5. A device as set forth in claim 4 wherein said frame includes an upstanding inwardly turned rim, said anchoring pockets being punched holes extending in opposite directions whereby punched material extends from both said upper surface and said lower surface of said frame, said shape distorting holes being arcuate in shape, and said insert being weakened at said tabs to comprise said removal means.

6. A device as set forth in claim 5 wherein wear pins extend from said wear plate and are spaced from said insert.

7. A device as set forth in claim 5 wherein said tabs being integral with said frame, removal means comprises perforations located at the juncture of said tabs with said frame, and said wear plate incorporating corrective means.

8. A device as set forth in claim 5 wherein said wear plate includes a rim juxtaposed to said frame rim.

9. A device as set forth in claim 3 wherein said insert is corrugated and perforated.

10. A device as set forth in claim 3 wherein loops are on said lower surface to comprise said anchoring means.

11. A device as set forth in claim 3 wherein mesh material is secured to said insert to comprise said anchoring means.

12. A device as set forth in claim 3 wherein said frame includes an upstanding inwardly turned rim, said tabs being integral extensions of said rim, and said locking means being provided in said wear plate.

13. A device as set forth in claim 12 wherein said locking means includes a pair of holes in said wear plate, and a tightening member inserted through said pair of holes.

14. A device as set forth in claim 12 wherein said locking means includes a removable band for extending peripherally around said wear plate and said frame.

15. A device as set forth in claim 3 wherein said tabs are integral extensions at the free ends of said insert, said locking means including an apertured block on each tab, and tightening means extending through the apertures of said blocks.

16. A device as set forth in claim 4 wherein the lower surface of said wear plate is undulated.

17. A device as set forth in claim 2 wherein said tabs are a pair of removable blocks disposed against said frame, said tabs including means for connection to a power source, tightening means between said blocks urging said blocks toward each other and against said frame, and said blocks thereby being both said tabs and a portion of said locking means.

18. A device as set forth in claim 1 wherein said tabs comprise a pair of magnets in magnetic engagement with said frame, and electrical cables connected to said magnets.

19. A device as set forth in claim 3 wherein said tabs are separable members locked to said frame.

20. A horseshoe comprising a U-shaped electrically resistive metal frame, electrically resistive tabs on said frame for receiving and transmitting the application of electric power thereto, removable locking means on said frame, anchoring adhesive receiving pockets in said frame, and shape distorting holes extending from an edge of said frame.

21. A horseshoe as set forth in claim 20 including a wear plate secured to the under surface of said frame and made of a cushioning material, and said frame having an upstanding inwardly inclined rim.

22. A horseshoe as set forth in claim 21 wherein said tabs are integral extensions of said rim, and said locking means including a pair of holes in said wear plate.

23. A horseshoe as set forth in claim 21 wherein said tabs are integral extensions at the free ends of said frame, said locking means including an apertured block on each tab, a tightening member between the apertures of said blocks, and the junctures of said frame and said tabs being weakened.

24. A horseshoe as set forth in claim 21 wherein said tabs are a pair of removable blocks disposed against said frame, said tabs including means for connection to a power source, tightening means between said blocks urging said blocks toward each other and against said frame, and said blocks thereby being both said tabs and a portion of said locking means.

25. A horseshoe as set forth in claim 21 wherein said tabs comprise a pair of magnets in magnetic engagement with said frame, and electrical cables connected to said magnets.

26. A horseshoe as set forth in claim 21 wherein said frame is about one-eighth inch thick.

27. A horseshoe as set forth in claim 21 wherein said frame is about 0.02 inch thick.

28. A method of attaching a horseshoe to a hoof including applying uncured thermo accelerate adhesive on the upper electrically resistive surface of a horseshoe and on the bottom of a hoof, locking the horseshoe on the hoof with the adhesives in contact with each other, and applying electrical power to the electrically resistive surface of the horseshoe to accelerate the curing of the adhesive.

29. In the method of claim 28 including forming a cushioning wear plate on the lower surface of a stiffening frame to comprise the horseshoe, placing the thusly formed horseshoe on the hoof before application of the adhesive, fitting to horseshoe to conform to the size and shape of the hoof, removing the horseshoe for the application of the adhesive, raising the horse's leg before the power is turned on, lowering the leg after the adhesive has initially set, turning the power off after the adhesive has finally set, and removing the lock from the horseshoe.

30. In the method of claim 28 including forming a cushioning wear plate on a stiffening frame to comprise the horseshoe, placing the thusly formed horseshoe on the hoof before application of the adhesive, permitting the horse's foot to contact the ground during the entire adhesive curing period, and removing the lock from the horseshoe.

31. A device for covering the wear surface of a foot comprising a U-shaped electrically resistive frame rim for fitting on the hoof of a horse, an upstanding flange around a portion of the outer edge of said rim for fitting against the hoof, said flange terminating remote from the free ends of said rim, adhesive means on said rim for securing said device to the hoof and a locking element secured to each free end of said rim for holding said rim to the hoof until said adhesive has cured by the application of electric power to said resistive frame.

* * * * *